Sept. 30, 1924.
R. D. MERSHON
1,509,971
INSULATED TERMINAL FOR ELECTRICAL APPARATUS
Filed Jan. 8, 1920
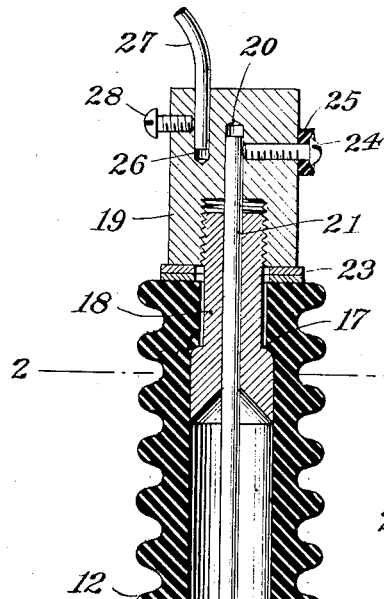
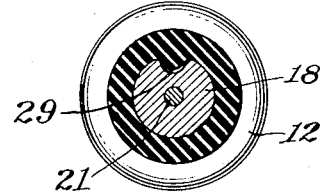
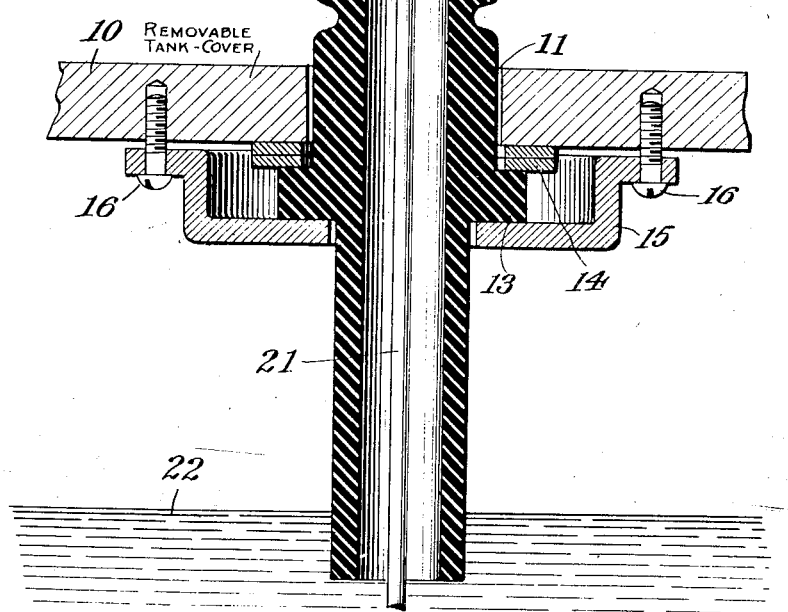
Inventor
R. D. Mershon
by his Attorneys
Kerr, Page, Cooper & Hayward Patented Sept. 30, 1924.

1,509,971

UNITED STATES PATENT OFFICE.

RALPH D. MERSHON, OF NEW YORK, N. Y.

INSULATED TERMINAL FOR ELECTRICAL APPARATUS.

Application filed January 8, 1920. Serial No. 350,183.

*To all whom it may concern:*

Be it known that I, RALPH D. MERSHON, a citizen of the United States of America, residing at New York, in the county and State of New York, have invented certain new and useful Improvements in Insulated Terminals for Electrical Apparatus, of which the following is a full, clear, and exact description.

In electrical apparatus involving the use of a liquid in a closed receptacle or tank, as for example oil-filled transformers, storage batteries, electrolytic condensers, electrolytic rectifiers, electrolytic lightning arresters, etc., it is sometimes desirable to have the terminals of the apparatus not only insulated from the tank but also sealed in the cover or wall thereof, say to prevent or minimize loss by evaporation of the liquid, or contamination of the liquid by entry of impurities from the outside. This is especially true in the case of electrolytic condensers, where it is in general highly desirable to protect the electrolyte from such external agencies. I have accordingly been led to devise my present invention which has for its chief object to provide convenient and effective means for the purpose. Another object is to provide for the purpose means which, when carried by the cover of the tank, will not have to be dismantled to permit removal of the cover. To these and other ends the invention consists in the novel features and combinations hereinafter described.

One form of the invention is illustrated in the accompanying drawing, in which—

Fig. 1 is a longitudinal section of the device, and Fig. 2 is a horizontal section on line 2—2 of Fig. 1.

The present embodiment of the invention is intended particularly for use with an electrolytic condenser, and in the drawing 10 designates the upper wall or cover of the tank or receptacle (not shown) containing the electrodes and electrolyte. This cover, preferably removable, is provided with an opening 11 through which extends an insulating tube or bushing 12 of porcelain or other suitable impervious material, having below the cover an outer circumferential shoulder or rib 13. Between the rib and the cover is a sealing gasket 14, composed preferably of one or more soft metal washers, usually aluminum, which are compressed by an aluminum cup or spider 15 engaging the flange 13 and drawn up firmly by aluminum screws 16. At its top the tube or bushing 12 has an inner circumferential rib or shoulder 17, against which is seated a correspondingly ribbed or shouldered sleeve 18, preferably of aluminum, extending above the tube 12 and having its upper end threaded to receive a cap-nut 19, preferably of aluminum, having a central recess 20 to receive the upper end of the aluminum conductor 21 which at its lower end is suitably connected to the electrodes or other devices (not shown) in the electrolyte 22. Between the nut and the insulating tube is a sealing gasket 23, preferably composed of one or more soft metal washers, usually aluminum. The conductor 21 is held firmly in electrical connection with the cap 19 by a binding screw 24. The latter may fit its hole tightly, to make a tight joint thereat, and for additional security a yielding gasket may be used under its head as indicated at 25. The cap also has a recess 26 for connection with an external circuit by means of a wire or conductor 27 held tightly in electrical contact with the cap by means of a screw 28.

To prevent rotation of the sleeve 18 in setting up the cap-nut 19 the tube 12 may have on its inside a lug or rib 29, Fig. 2, to cooperate with a longitudinal groove in the sleeve.

The outside of the tube 12 may be corrugated, as indicated, and the inside also, if desired to increase the path of current leakage between the cap 19 and the cover 10 over the surface of the tube, as will be readily understood.

From the foregoing it will be seen that the device illustrated affords air-tight electrical connection with the outside of the tank, and that to remove the cover it is only necessary to loosen the screw 24, whereupon the cover can be lifted off. Replacement is equally easy, and to facilitate inserting the conductor 21 into the bore of sleeve 18 the lower end of the latter may have a tapered recess, as shown. There is no possibility, or at most no likelihood, of the electrolyte being contaminated, since the only metal part of the device with which the electrolyte can come in contact is aluminum.

It will be observed that even with tank well filled with eletrolyte (usually an aqueous solution of sodium phosphate or tetraborate) there is considerable space between the electrolyte and the point where the "live" metal (that is, the conductor 21 or the sleeve 18) comes in contact with the bushing 12. This is markedly advantageous, since I have found that if the metal becomes wetted by the electrolyte or coated with salt deposited therefrom, the tendency to corrode the metal is greatest at the point referred to, thus making it desirable to have such point as far as possible from the electrolyte to minimize the likelihood of electrolyte getting up that far, as by reason of splashing or otherwise. For the same reason the part of the bushing below the cover is preferably extended well into the electrolyte. When the condenser or rectifier is in operation the electrolyte is decomposed, liberating oxygen and hydrogen, and eventually the accumulation of these gases in the terminal (assuming that they cannot escape as fast as they are formed) fills the bushing and therefore depresses the electrolyte therein to the bottom of the bushing, thus removing the electrolyte still further from the point where the live metal comes in contact with the bushing. If by any chance the electrolyte should reach or splash up to the top of the bushing the sleeve 18 is large and massive enough to stand corrosion for a long period without being injured enough to be useless.

It is to be understood that the invention is not limited to the specific construction herein described but can be embodied in other forms without departure from its spirit.

I claim:

1. The combination with a tank for containing an electrolyte and having an opening in a wall thereof, of sealed means for electrical connection between the inside and outside of the tank, comprising an insulating bushing extending through the opening and into the electrolyte and sealed to the wall, a conducting member sealed on the outer end of the bushing for connection with an external circuit, and an electrical conductor extending from within the tank through the bushing and into electrical connection with said conducting member, said bushing and conductor being spaced apart a substantial distance at the inner end of the bushing and throughout the major portion of the length of the latter.

2. The combination with a tank for the purpose described, having an opening in a wall thereof, of sealed means for electrical connection between the inside and outside of the tank, comprising an insulating bushing extending through the opening and sealed to the wall, a sleeve in the outer end of the bushing, a gasket on the outer end of the bushing around the sleeve, a metal cap-nut threaded on the outer end of the sleeve to compress the gasket against the end of the bushing, and a conductor extending from within the tank through the bushing and sleeve into electrical connection with said cap-nut and terminating inside of the latter.

3. The combination with a tank for the purpose described, having an opening in a wall thereof, of means for electrical connection between the inside and outside of the tank, comprising an insulating bushing extending through the opening and secured therein, a sleeve in the outer end of the bushing, a metal cap-nut threaded on the outer end of the sleeve and having a recess or socket in line with the bore of the sleeve, and a conductor extending from within the tank through the bushing and sleeve into the recess or socket in the cap-nut for electrical connection therewith and terminating inside of said cap-nut.

4. The combination with a tank for the purpose described, having an opening in a wall thereof, of means for electrical connection between the inside and outside of the tank, comprising an insulating bushing extending through the opening and sealed therein, a sleeve in the outer end of the bushing, a gasket on the outer end of the bushing around the sleeve, a metal cap-nut screwed on the outer end of the sleeve to compress the gasket against the end of the bushing and having an outwardly closed socket in line with the bore of the sleeve to receive a conductor extending through the sleeve from within the tank, and means for connecting the cap-nut with an external conductor.

5. A device for the purpose described, comprising an insulating tube having a threaded sleeve seated in an end of the same, a metal cap-nut screwed on the outer end of the sleeve and having an outwardly closed socket in line with the bore of the sleeve to receive a conductor extending through said bore, and a screw threaded in the side of the cap-nut to bind such conductor in the socket.

6. A device for the purpose described, comprising an insulating tube, a threaded sleeve seated in one end of the tube, a metal cap-nut screwed on the outer end of the sleeve and having an outwardly closed socket in line with the bore of the sleeve to receive a conductor extending through said bore, and a screw threaded in the side of the nut to bind the conductor in the socket, the nut having also means for holding an external conductor in electrical connection with the nut.

7. The combination with a tank for the purpose described, containing an electrolyte and having a removable cover provided with an opening, of an insulating bushing extending through the opening and secured therein and having its lower end immersed in the electrolyte, a conductor extending into the bushing from inside the tank, and a conducting member secured on the outer end of the bushing and having releasable electrical connection with said conductor, said bushing and conductor being spaced a substantial distance apart at the inner end of the bushing and throughout the major portion of the length of the latter.

8. The combination with a tank for the purpose described, containing an electrolyte and having a removable cover provided with an opening of an insulating bushing extending through the opening and sealed therein and having a tubular extension below the cover reaching into the electrolyte, a conductor extending up through the bushing, and conducting means sealed on the outer end of the tube and electrically connected with the said conductor, for connecting the latter with an external circuit, said bushing adapted to contain a body of gas to prevent access of the electrolyte to said conducting means.

9. The combination with a tank for the purpose described, having an opening in a wall thereof and containing an electrolyte, of a long insulating bushing extending through and sealed in said opening, and a conductor extending from inside of the tank through the bushing and spaced from the walls of the bushing, the latter being adapted to contain a body of gas to prevent access of the electrolyte to said conducting means.

10. The combination with a tank containing an electrolyte and having an opening in a wall thereof, of a long insulating bushing sealed in said opening and extending inwardly into the electrolyte, and a conductor extending from the electrolyte through the bushing and spaced from the walls of the latter, said bushing being adapted to contain a body of gas to prevent access of the electrolyte to said conducting means.

11. The combination with a tank containing an electrolyte and having an opening in the cover thereof, of a long insulating bushing sealed in said opening and extending downwardly into the electrolyte, a conductor extending from the electrolyte through the bushing and spaced from the walls of the latter, and releasable means for sealing the conductor in the outer end of the bushing.

In testimony whereof I hereunto affix my signature.

RALPH D. MERSHON.